(12) United States Patent
Hen

(10) Patent No.: US 8,881,326 B2
(45) Date of Patent: Nov. 11, 2014

(54) MODULAR INFANT FURNITURE AND CONNECTORS THEREFOR

(76) Inventor: Shlomo Hen, Holon (IL)

( * ) Notice: Subject to any disclaimer, the term of this patent is extended or adjusted under 35 U.S.C. 154(b) by 81 days.

(21) Appl. No.: 13/364,567

(22) Filed: Feb. 2, 2012

(65) Prior Publication Data
US 2013/0051910 A1 Feb. 28, 2013

Related U.S. Application Data

(60) Provisional application No. 61/528,245, filed on Aug. 28, 2011.

(51) Int. Cl.
*A47D 13/06* (2006.01)
*F16B 12/10* (2006.01)
*F16B 7/04* (2006.01)
*F16B 5/06* (2006.01)

(52) U.S. Cl.
CPC .............. *F16B 12/10* (2013.01); *F16B 5/0664* (2013.01); *F16B 7/0473* (2013.01); *F16B 5/0642* (2013.01)
USPC .................................. 5/93.1; 256/19; 256/24

(58) Field of Classification Search
CPC ....... E04H 17/1417; A47D 7/00; A47D 13/06
USPC ............ 256/22, 19, 24, 25, 59, 65.02, 65.03, 256/65.04, 65.05, 65.14; 403/252, 253; 5/93.1, 97, 100
See application file for complete search history.

(56) References Cited

U.S. PATENT DOCUMENTS

| | | | | |
|---|---|---|---|---|
| 2,654,579 | A * | 10/1953 | Cremens | 256/21 |
| 5,134,732 | A * | 8/1992 | Li | 5/93.1 |
| 5,803,645 | A * | 9/1998 | Moser et al. | 403/252 |
| 7,503,550 | B2 * | 3/2009 | Liefke | 256/24 |
| 7,665,162 | B2 * | 2/2010 | Peer | 5/93.1 |
| 2007/0012904 | A1 * | 1/2007 | Zell et al. | 256/65.06 |
| 2009/0302291 | A1 * | 12/2009 | Walker | 256/65.02 |
| 2010/0237308 | A1 * | 9/2010 | Lo | 256/26 |

* cited by examiner

*Primary Examiner* — Michael P Ferguson
(74) *Attorney, Agent, or Firm* — Daniel J. Swirsky; AlphaPatent Associates Ltd.

(57) ABSTRACT

A modular infant furniture having crib and play-pen configurations as well as versatile connectors therefor are disclosed, where modular infant furniture includes a bar assembly having superior and inferior connectors, and where a bar element, compatible with female connectors and/or male connectors, extends between the superior and inferior connectors.

10 Claims, 17 Drawing Sheets

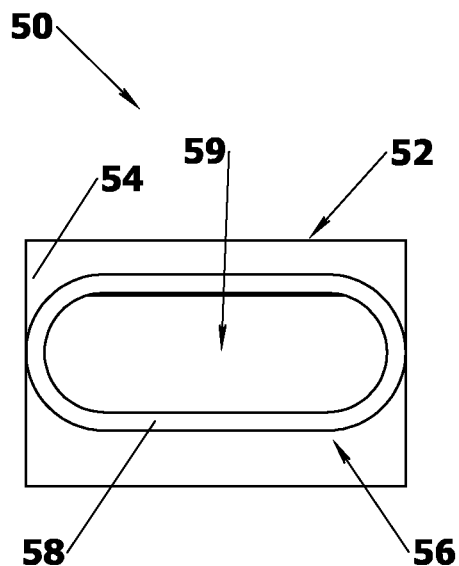
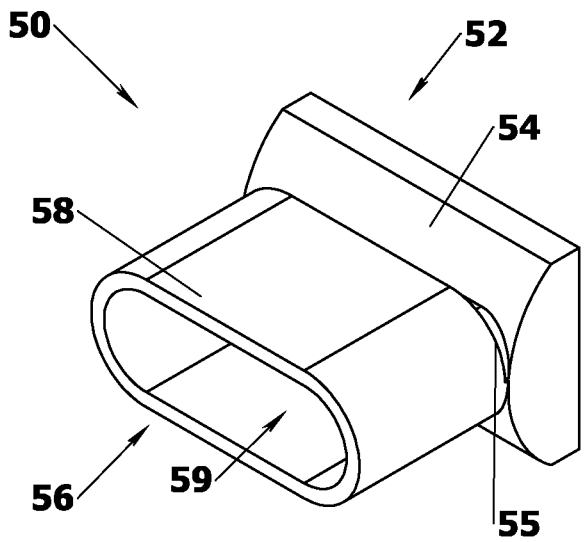
Fig. 5B            Fig. 5A
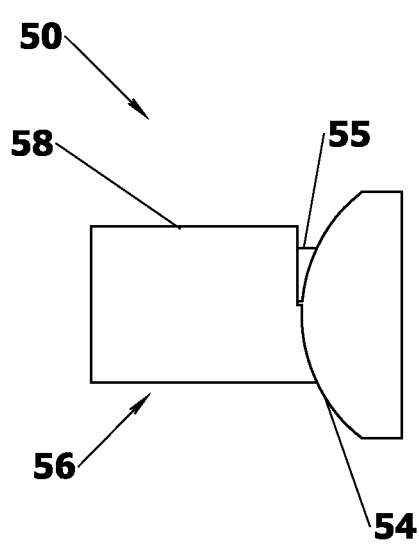
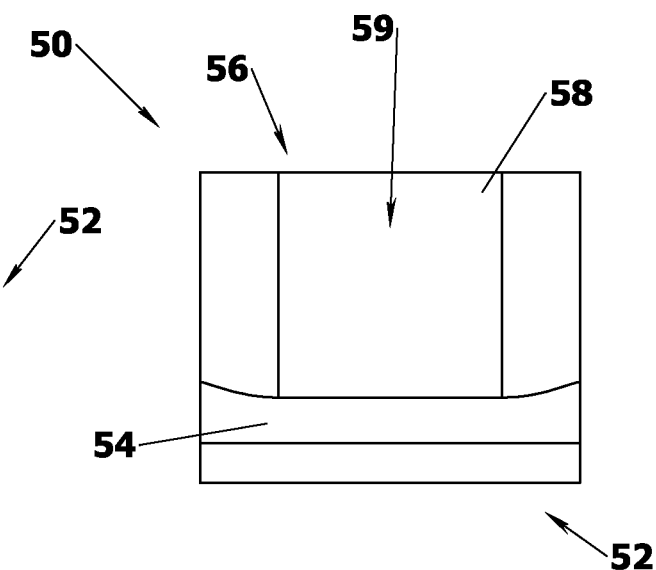
Fig. 5D            Fig. 5C

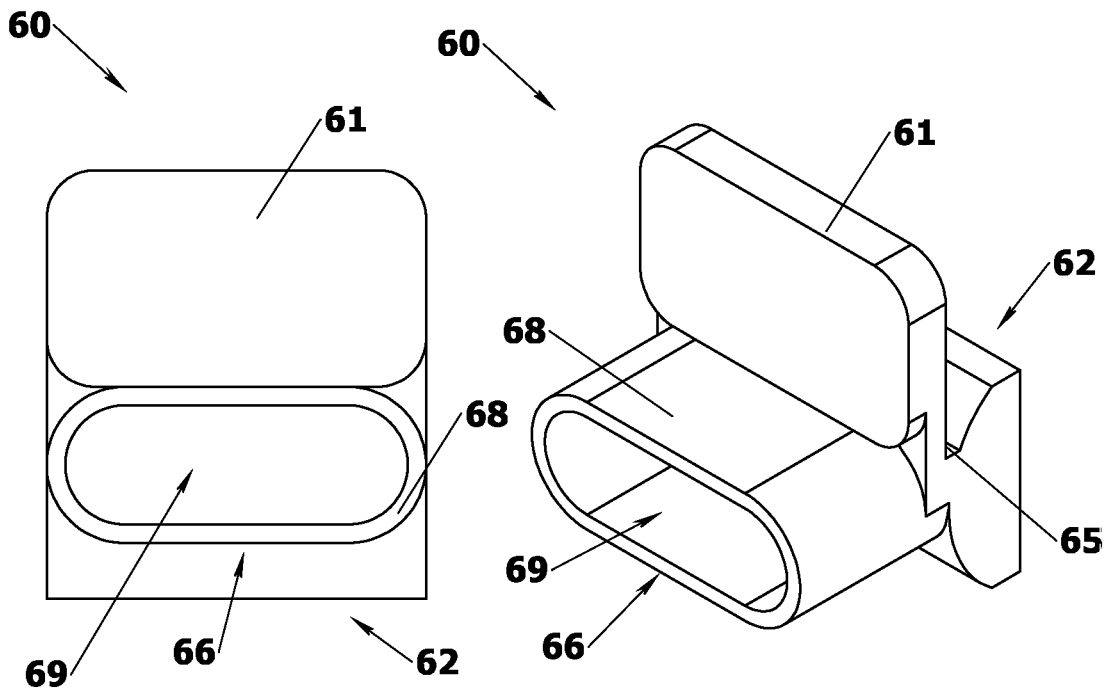
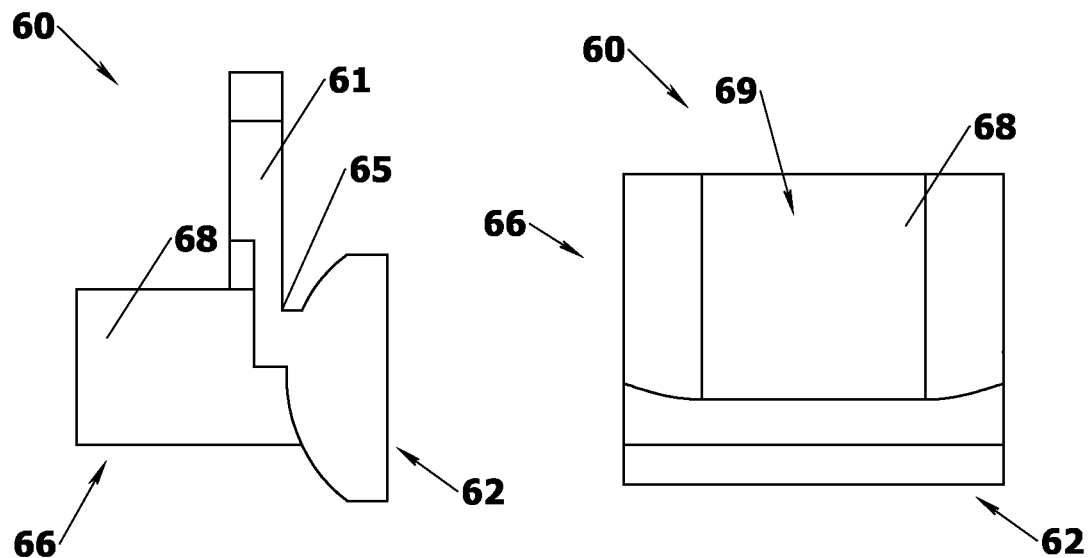
Fig. 6B    Fig. 6A
Fig. 6D    Fig. 6C

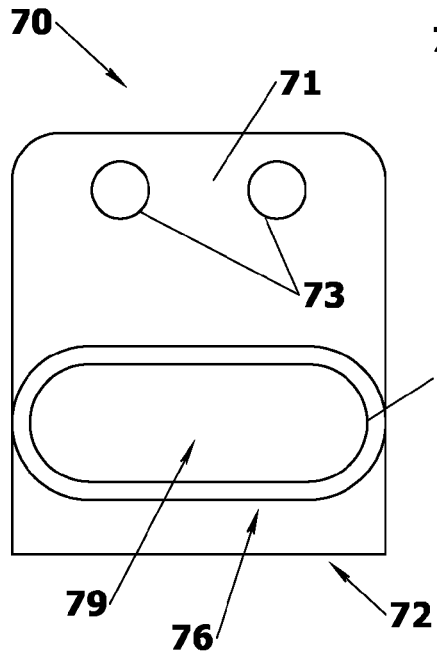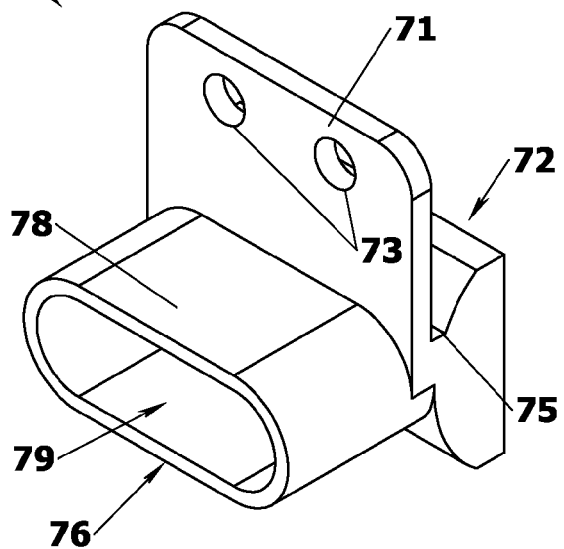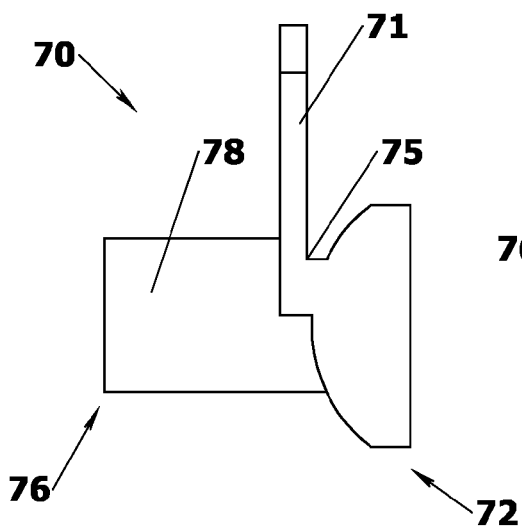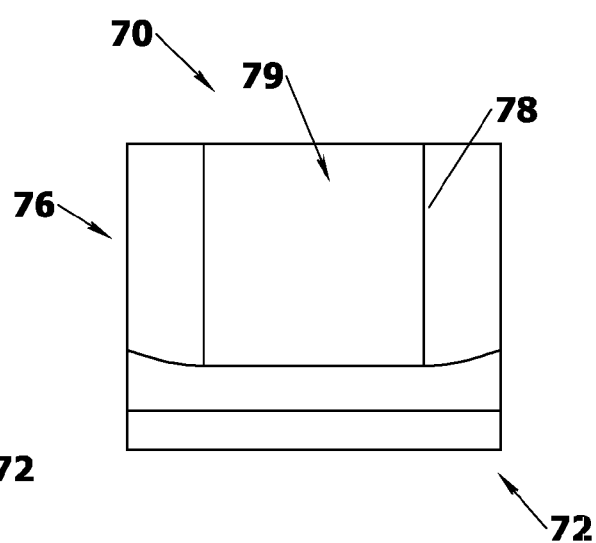
Fig. 7B
Fig. 7A
Fig. 7D
Fig. 7C

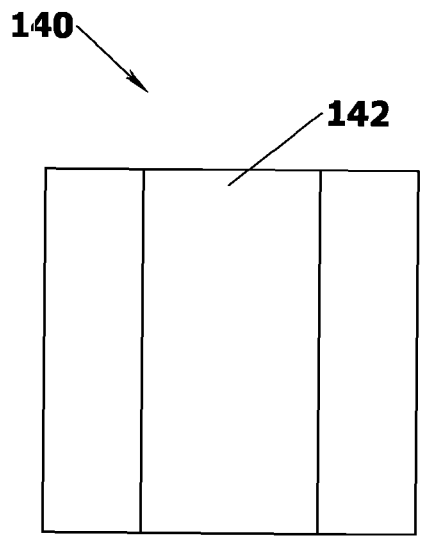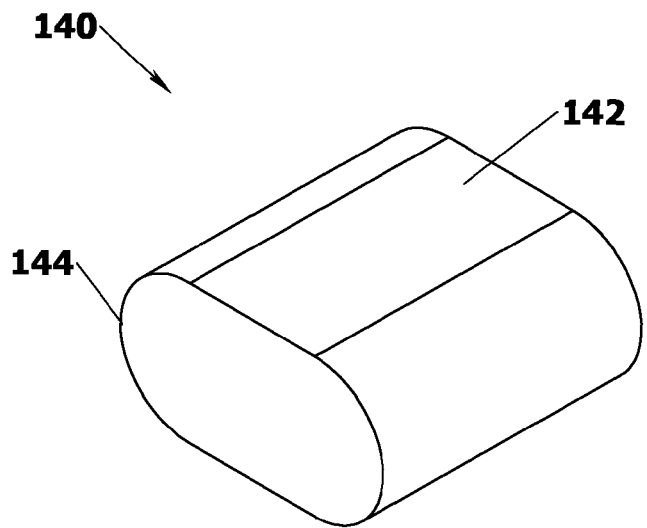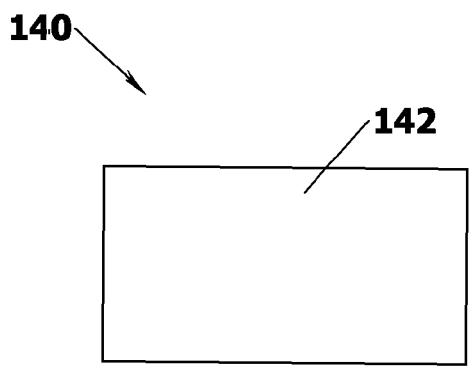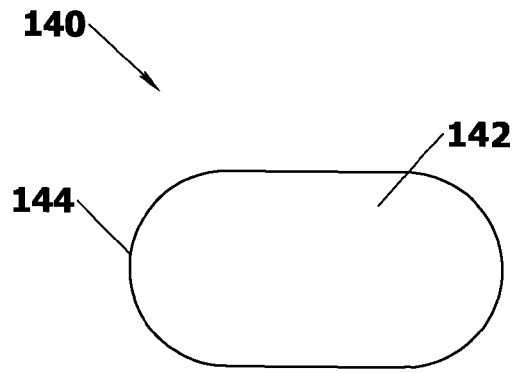
Fig. 14B  Fig. 14A
Fig. 14D  Fig. 14C

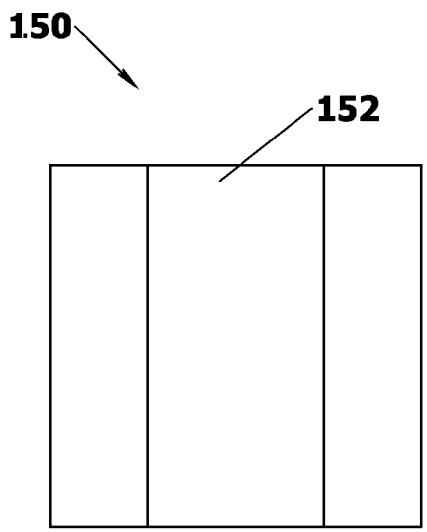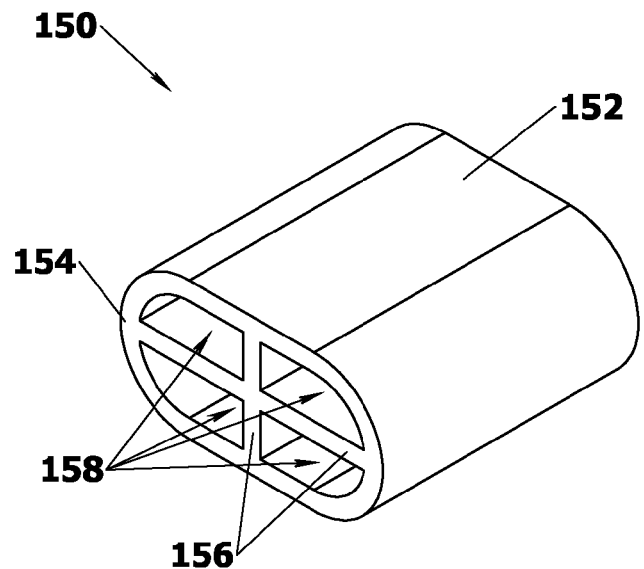
Fig. 15B Fig. 15A
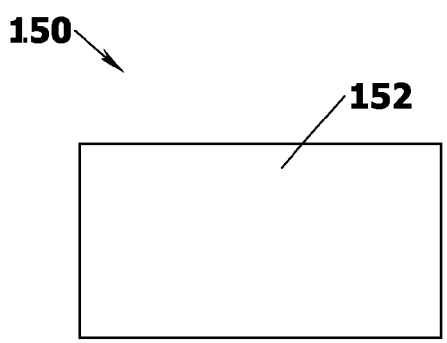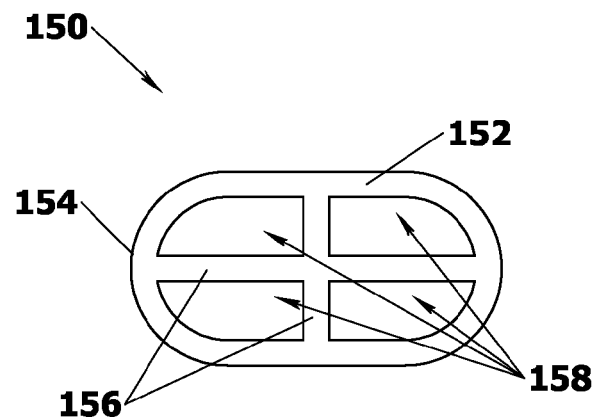
Fig. 15D Fig. 15C

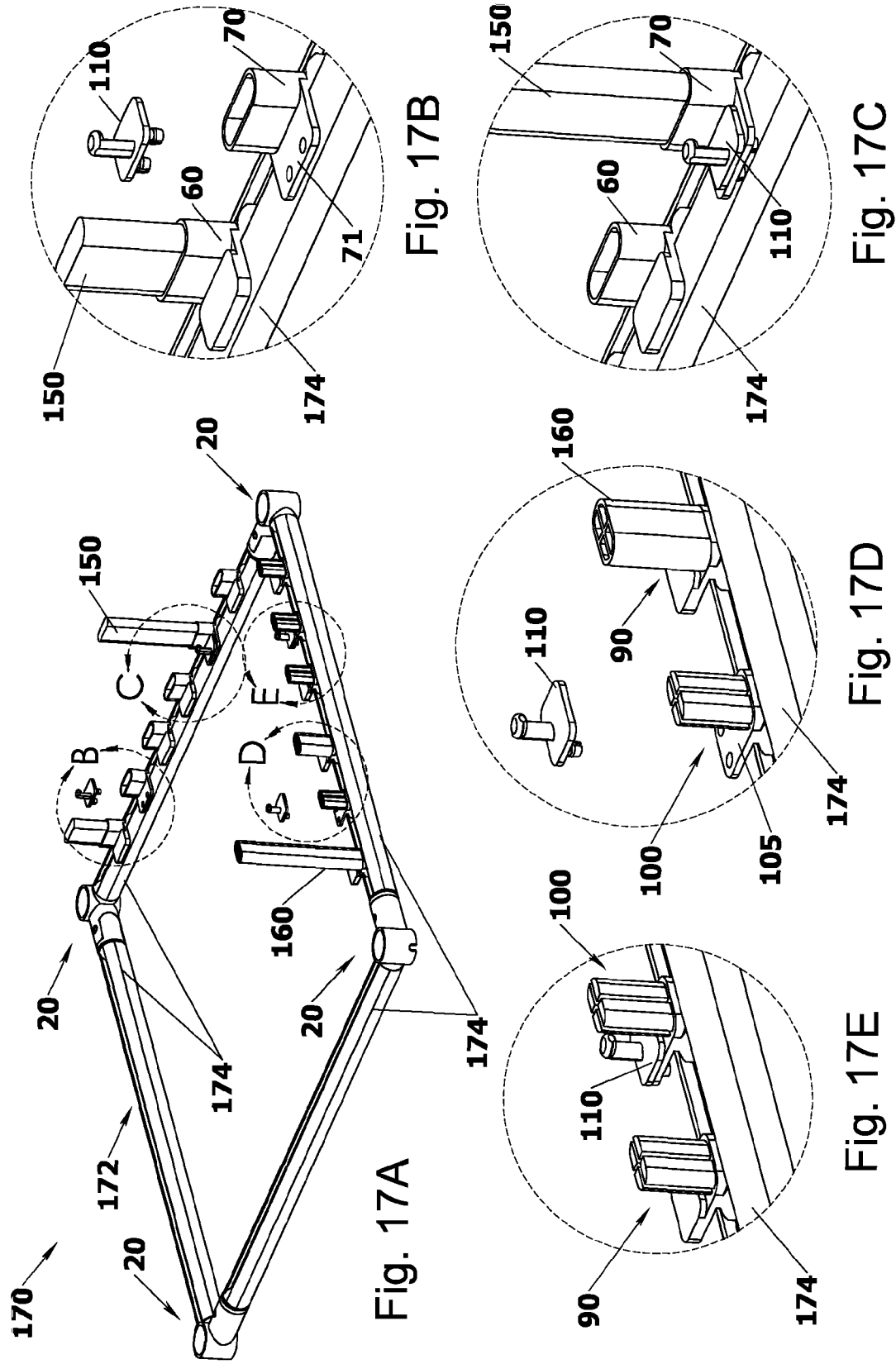

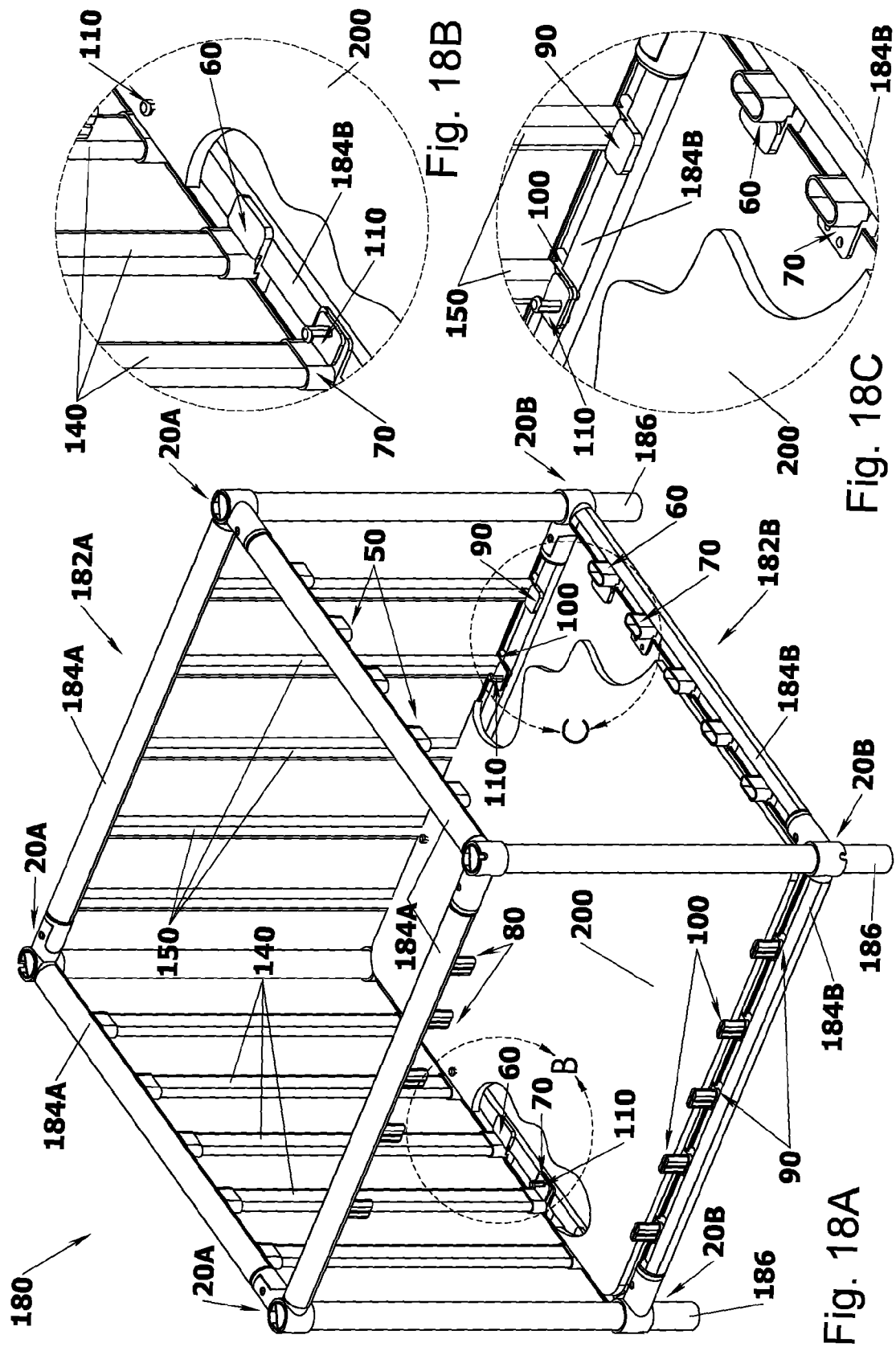

US 8,881,326 B2

MODULAR INFANT FURNITURE AND CONNECTORS THEREFOR

CROSS-REFERENCE TO RELATED APPLICATIONS

This application claims priority benefit of U.S. Provisional Patent Application No. 61/528,245, filed Aug. 28, 2011, the contents of which are incorporated herein by reference in their entirety.

FIELD OF THE INVENTION

In general, the present invention pertains to the arts of furniture for infants. In particular, the invention relates to modular infant furniture having crib and play-pen configurations as well as versatile connectors therefor.

BACKGROUND OF THE INVENTION

There are structural members that used in the art for construction of infant furniture. These structural members comprise an essentially elongated frusto-cylindrical shell profile. The frusto-cylindrical shell profile is of indefinite length and is typically cut into segments of predetermined length, from a sufficiently long master piece. The frusto-cylindrical shell profile comprises partition, essentially paralleling the plane of the frustum. The frustum at cylindrical shell profile defines a slot, which extends along the entire length of the structural member. This slot is used for an contiguous insertion of the terminal portions of bar gratings into the portion of the structural member in-between the partition and the slot, forming frusto-arcuate channel, in such a manner that the bars of the grating extend outwardly from the slot.

There are triad connectors that used in the art for construction of infant furniture. These triad connectors comprise an annular portion, adapted to receive a cylindrical or frusto-cylindrical structural member therein, for the construction of the framework forming the infant furniture. Such triad connectors further include arcuately ribbed portion. The arcuately ribbed portion is adapted to be detachably inserted into the frusto-arcuate channel, formed in-between the partition and the slot of frusto-arcuate structural members. The triad connector further comprises a hinge portion, including apertures, for a pivoting connection with a complimentary hinge unit. Complimentary hinge unit comprises hinge portion, adapted to be inserted into the hinge portion of triad connector. The hinge portion of complimentary unit including apertures, for a pivoting connection with the apertures in the hinge portion of the triad connector. The complimentary hinge unit further comprises an arcuately ribbed portion, adapted to be detachably inserted into the frusto-arcuate channel, formed in-between the partition and the slot of structural member.

Structural member constructing the framework forming the infant furniture are inserted into the annular portion of the triad connector, typically forming the vertical structural elements of the framework forming the infant furniture. The hinge portion of complimentary unit is inserted into and pivotally connected with hinge portion of the triad connector, by the means of a pivot inserted into their apertures. Into frusto-arcuate channels of the longitudinal and lateral members structural, are respectively detachably inserted arcuately the ribbed portion of the triad connector and the arcuately ribbed portion of the complimentary unit. The assembly forms a perpendicular connection of three structural members, which may form a corner of a cubical or rectangular parallelepiped structure, depending on the length of the members.

BRIEF DESCRIPTION OF THE DRAWINGS

The present invention will be understood and appreciated more comprehensively from the following detailed description taken in conjunction with the appended drawings in which:

FIG. 5A to 5D are respectively isometric, front, top and side views of a superior female connector;

FIG. 6A to 6D are respectively isometric, front, top and side views of an inferior female connector, with a supporting plate;

FIG. 7A to 7D are respectively isometric, front, top and side views of an inferior female connector, with an affixing plate;

FIG. 14A to 14D are respectively isometric, top, front and side views of a portion of a bar element, compatible with female connectors, shown in FIG. 5A to 7D;

FIG. 15A to 15D are respectively isometric, top, front and side views of a portion of a bar element, compatible with male connectors, shown in FIG. 8A to 10D;

FIG. 17A to 17E are a perspective view and enlarged views thereof of a partial sub-assembly of an inferior frame, for an embodiment of the modular infant furniture of the invention;

FIG. 18A to 18C are an isometric broken-out view and enlarged views thereof, showing a partial assembly of an embodiment of the modular infant furniture of the invention, in a play-pen configuration, using female connectors shown in FIG. 5A to 7D and male connectors shown in FIG. 8A to 10D as well as bar elements shown in FIGS. 14 and 15.

Figure 1A:
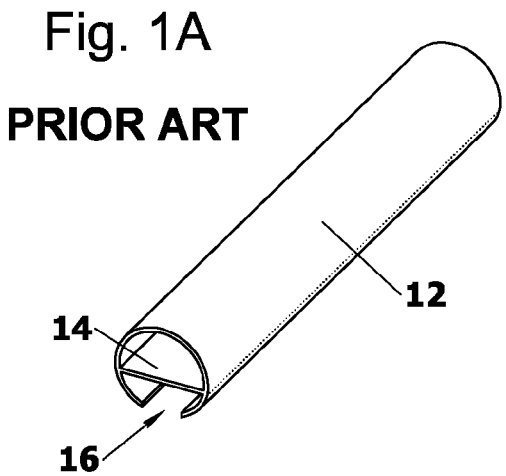
FIG. 1A to 1E are respectively isometric, front, side, top and bottom views of a construction member known in the art.
Figure 1B:
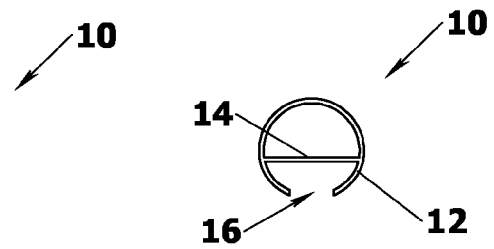
Figure 1C:
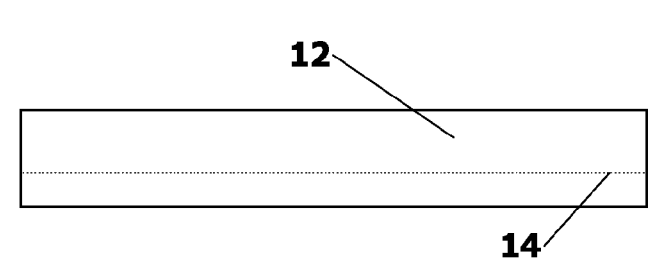
Figure 1D:
Figure 1E:
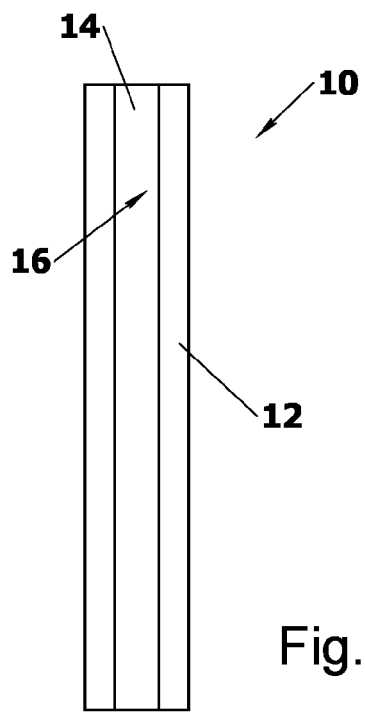
Figure 2A:
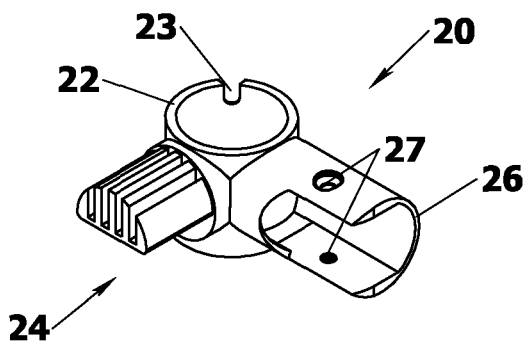
FIGS. 2A and 2B are respectively isometric and top views of a triad connector known in the art.
Figure 2B:
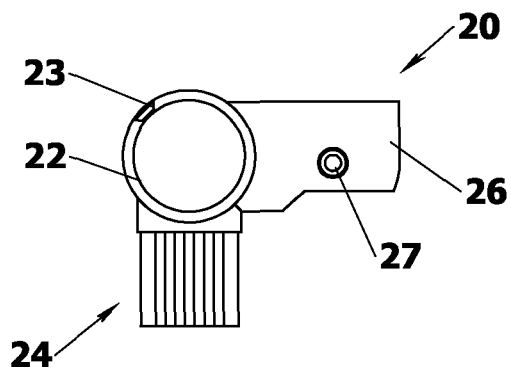
Figure 3A:
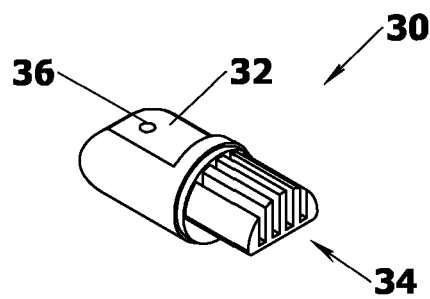
FIG. 3A to 3C are respectively isometric, side and top views of a complimentary unit for the triad connector shown in FIGS. 2A and 2B.
Figure 3B:
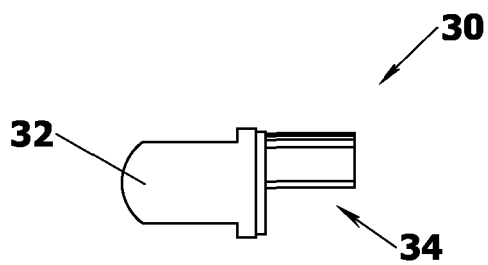
Figure 3C:
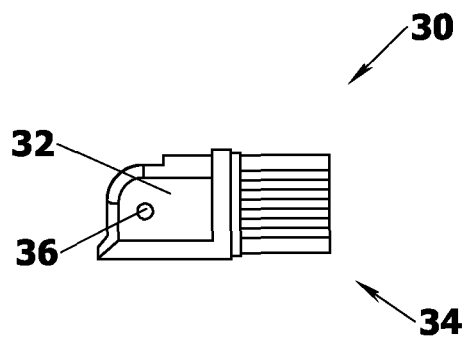

While the invention is susceptible to various modifications and alternative forms, specific embodiments thereof have been shown merely by way of example in the drawings. The drawings are not necessarily complete and components are not essentially to scale; emphasis instead being placed upon clearly illustrating the principles underlying the present invention.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with technology- or business-related constraints, which may vary from one implementation to another. Moreover, it will be appreciated that the effort of such a development might be complex and time-consuming, but would nevertheless be a routine undertaking for those of ordinary skill in the art having the benefit of this disclosure.

To illustrate structural members, used for construction of infant furniture, known in the art, reference is now made to FIG. 1A to 1E. Structural member 10, used for construction of infant furniture, known in the art, comprises an essentially elongated frusto-cylindrical shell profile 12. Frusto-cylindrical shell profile 12 is of indefinite length and is typically cut into segments of predetermined length, from a sufficiently long master piece. Frusto-cylindrical shell profile 12 comprises partition 14, essentially paralleling the plane of the frustum. The frustum at cylindrical shell profile 12 defines slot 16, which extends along the entire length of structural member 10. Slot 16 provides for an contiguous insertion of the base portions of bar gratings (not shown), such as bar grating shown in FIG. 12, into the portion of structural member 10 in-between partition 14 and slot 16, forming frusto-arcuate channel, in such a manner that the bars of the grating (not shown), such as bars of the grating shown in FIG. 12, extend outwardly from slot 16.

To illustrate the connectors, used for construction of infant furniture, known in the art, reference is now made to FIG. 2A to 3C. Triad connector 20 comprises annular portion 22, adapted to receive a structural member, such as member 10, or a merely cylindrical structural member, for the construction of the framework forming the infant furniture. Annular portion 22 includes aperture 23, for insertion of an affixing pin or bolt (not shown), throughout, into structural member inserted therein.

Triad connector 20 further comprises arcuately ribbed portion 24. Arcuately ribbed portion 24 is adapted to be detachably inserted into the frusto-arcuate channel, formed in-between partition 14 and slot 16 of structural member 10. Triad connector 20 further comprises hinge portion 26, including apertures 27, for a pivoting connection with the complimentary hinge unit 30.

Complimentary hinge unit 30 comprises hinge portion 32, adapted to be inserted into hinge portion 26 of triad connector 20. Hinge portion 32 of complimentary unit 30 including apertures 36, for a pivoting connection with apertures 27, in hinge portion 26 of triad connector 20. Complimentary hinge unit 30 further comprises arcuately ribbed portion 34, adapted to be detachably inserted into the frusto-arcuate channel, formed in-between partition 14 and slot 16 of structural member 10.

Figure 4A:
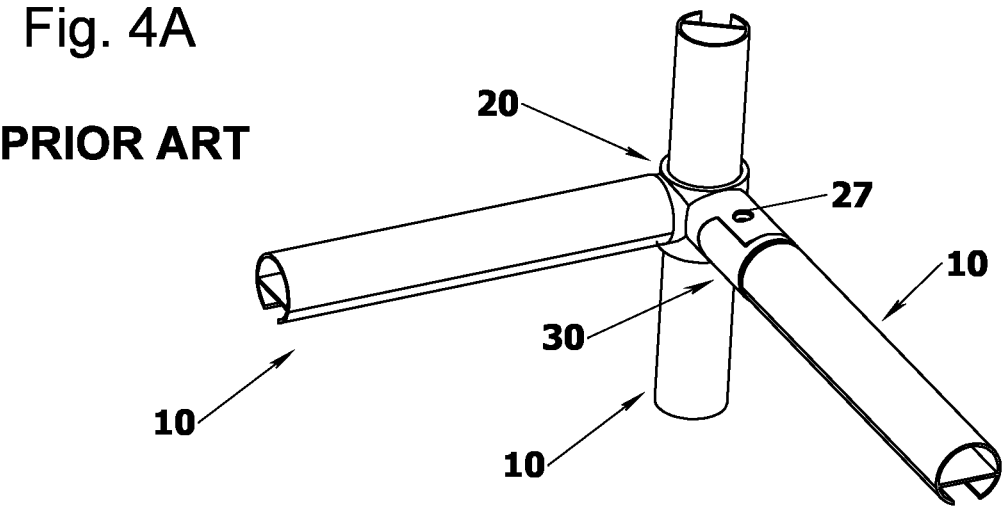
FIGS. 4A and 4B are respectively isometric and isometric exploded views of an assembly of the triad connectors with complimentary units thereof shown in FIG. 2A to 3C and construction members shown in FIG. 1A to 1E.
Figure 4B:
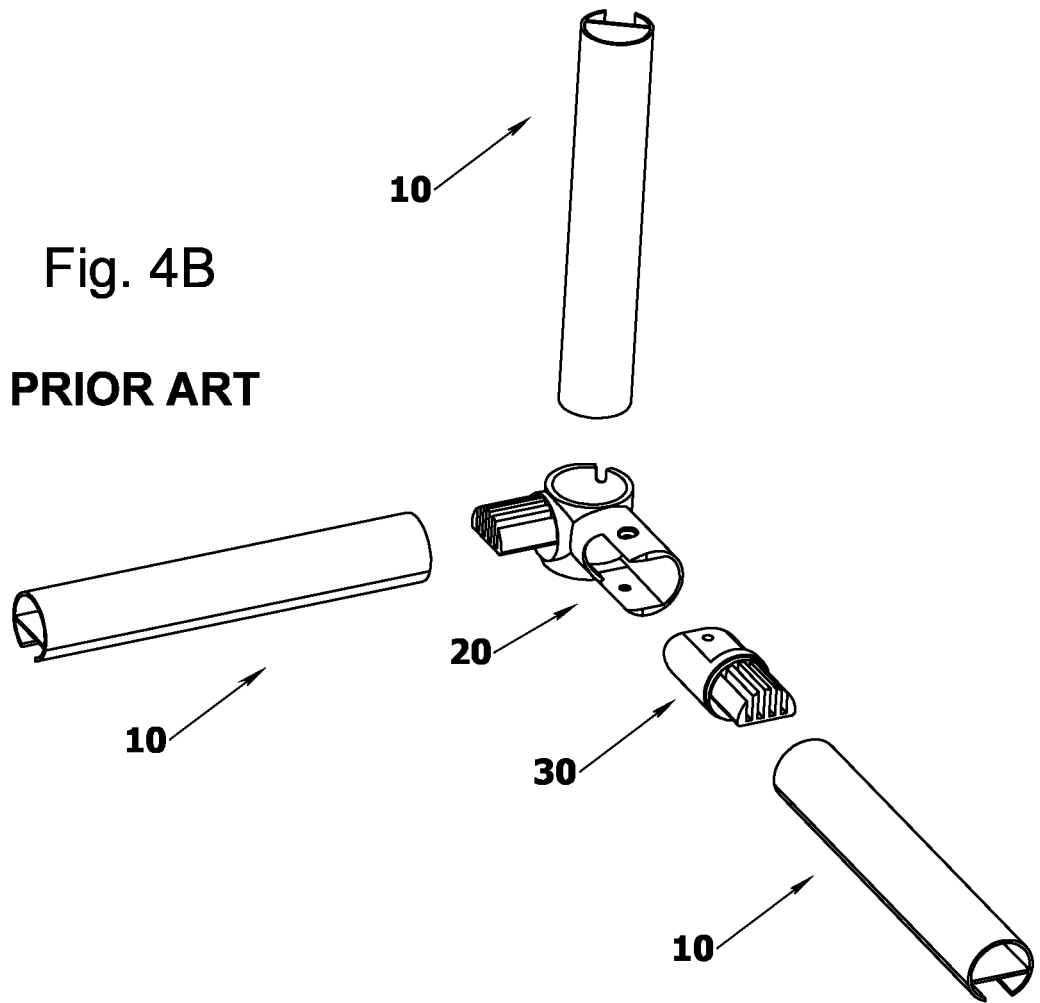
Figure 8B:
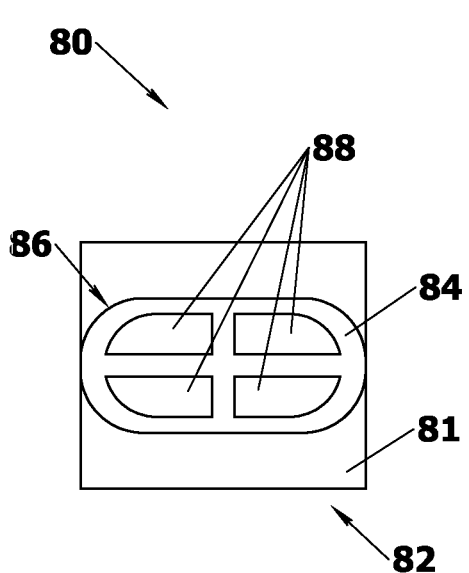
FIG. 8A to 8D are respectively isometric, top, front and side views of a superior male connector.
Figure 8A:
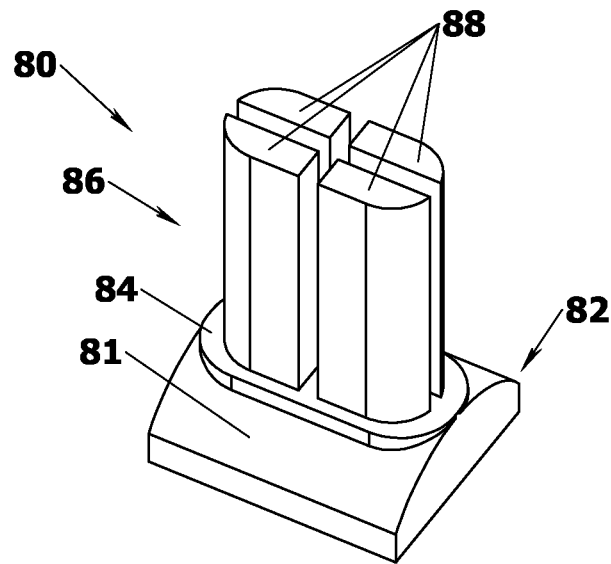
Figure 8D:
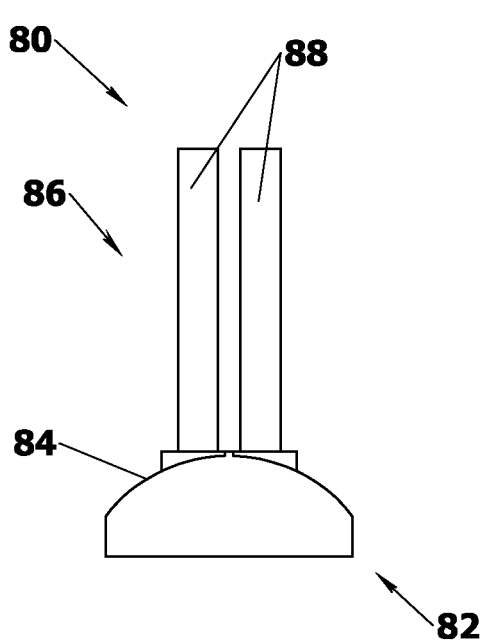
Figure 8C:
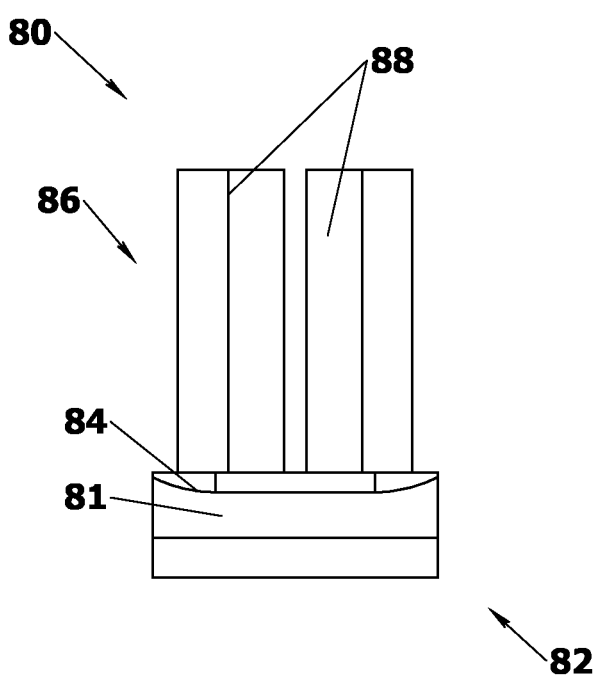
Figure 9B:
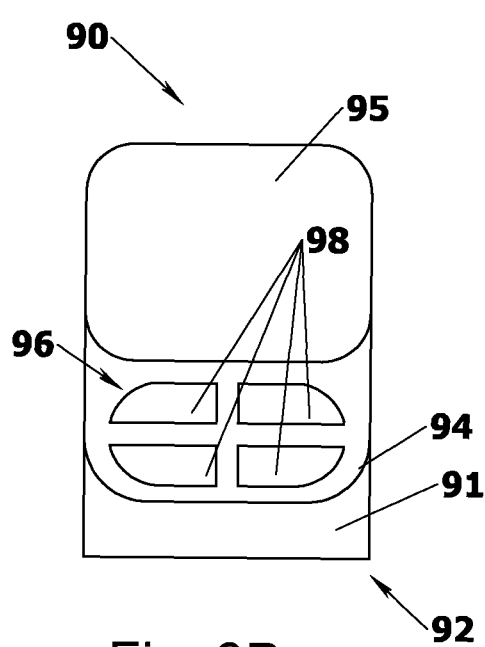
FIG. 9A to 9D are respectively isometric, top, front and side views of an inferior male connector, with a supporting plate.
Figure 9A:
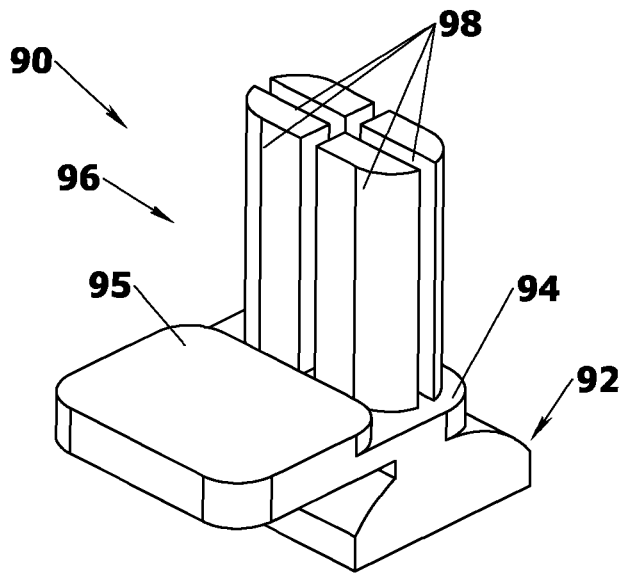
Figure 9D:
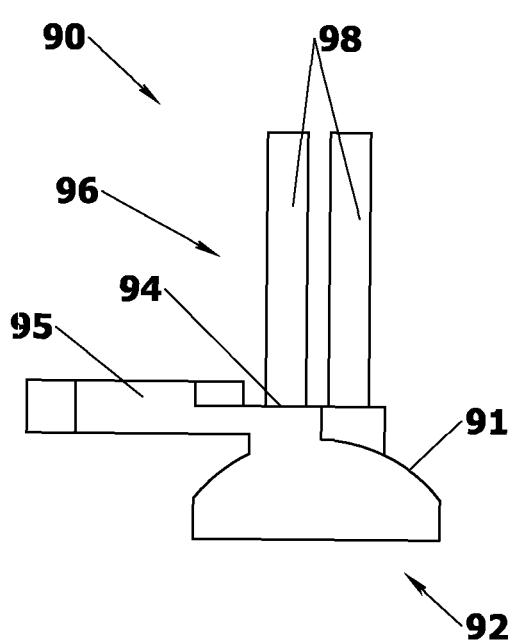
Figure 9C:
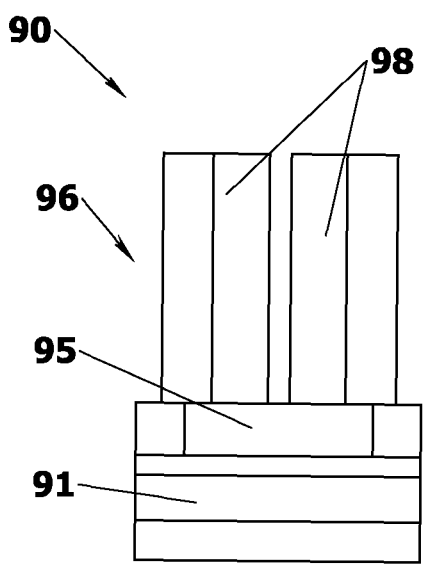
Figures 10A, 10B:
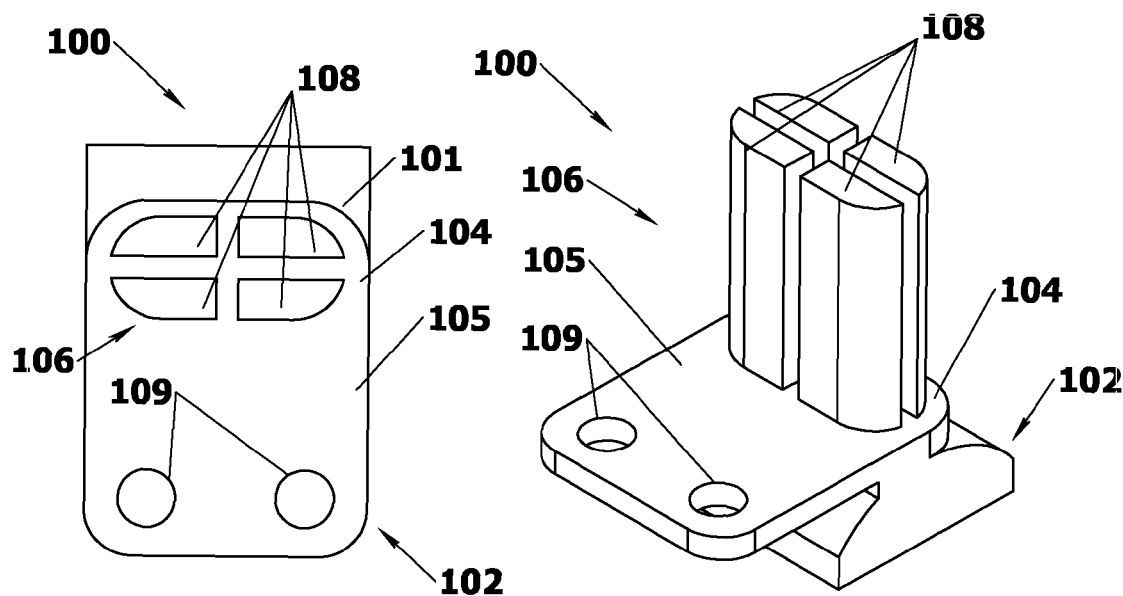
FIG. 10A to 10D are respectively isometric, top, front and side views of an inferior male connector, with an affixing plate.
Figures 10C, 10D:
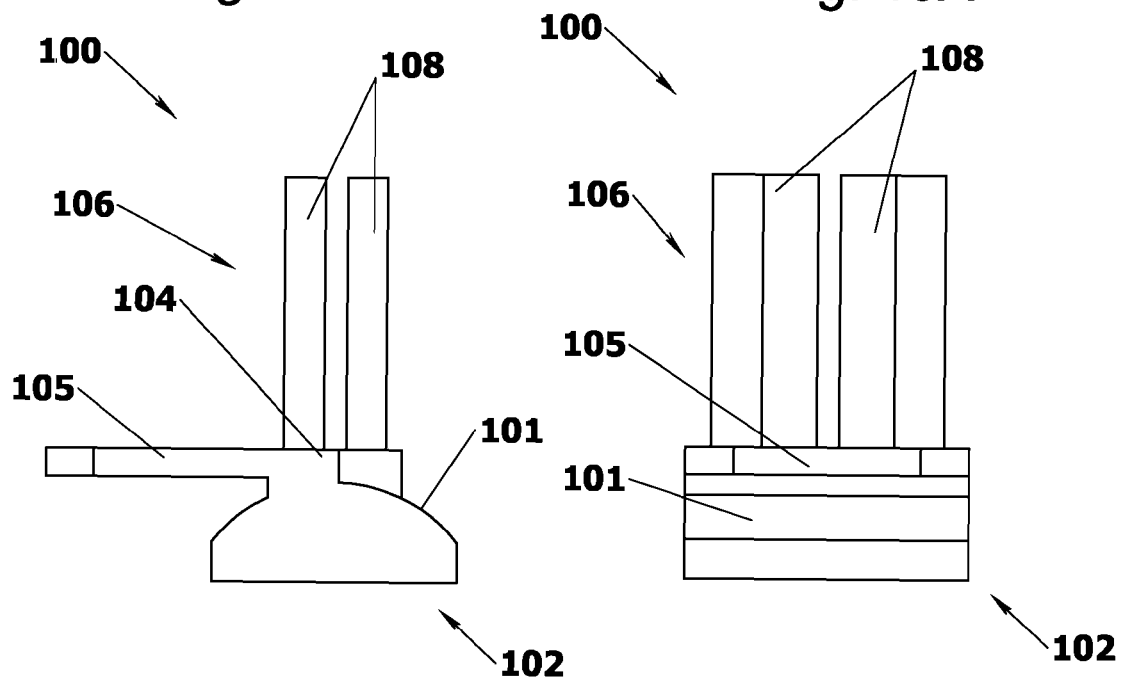
Figure 11B:
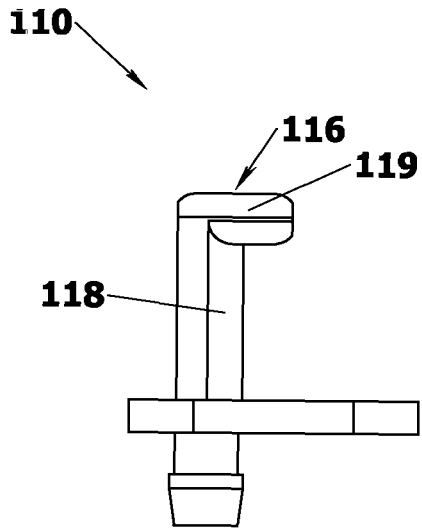
FIG. 11A to 11D are respectively isometric, side, front and back views of an affixing connector, compatible with the affixing plate of inferior male connectors, shown in FIG. 7A to 7D and FIG. 10A to 10D.
Figure 11A:
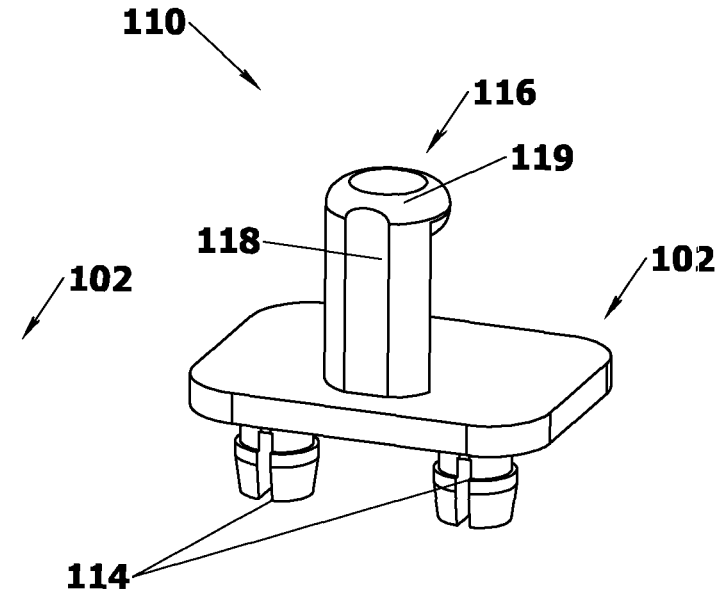
Figure 11D:
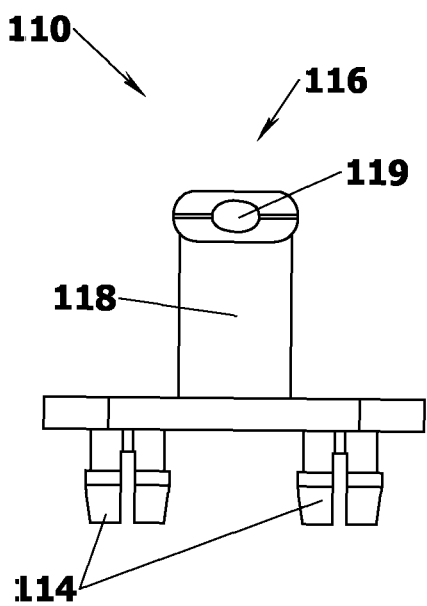
Figure 11C:
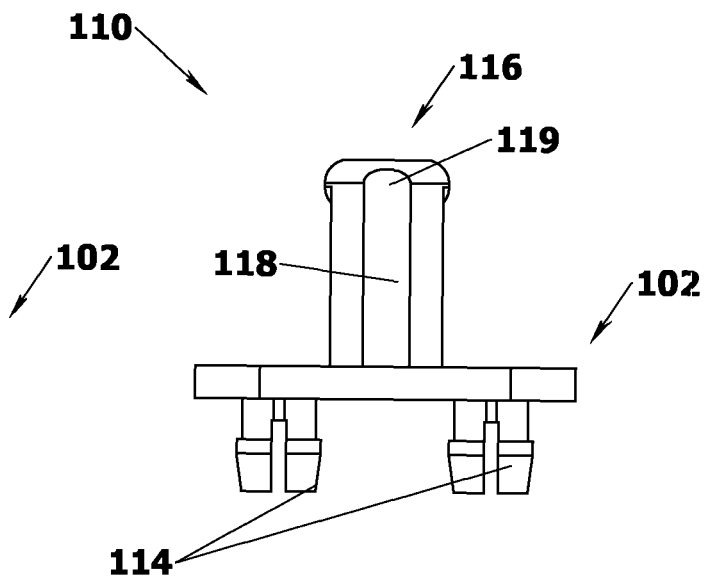
Figure 16:
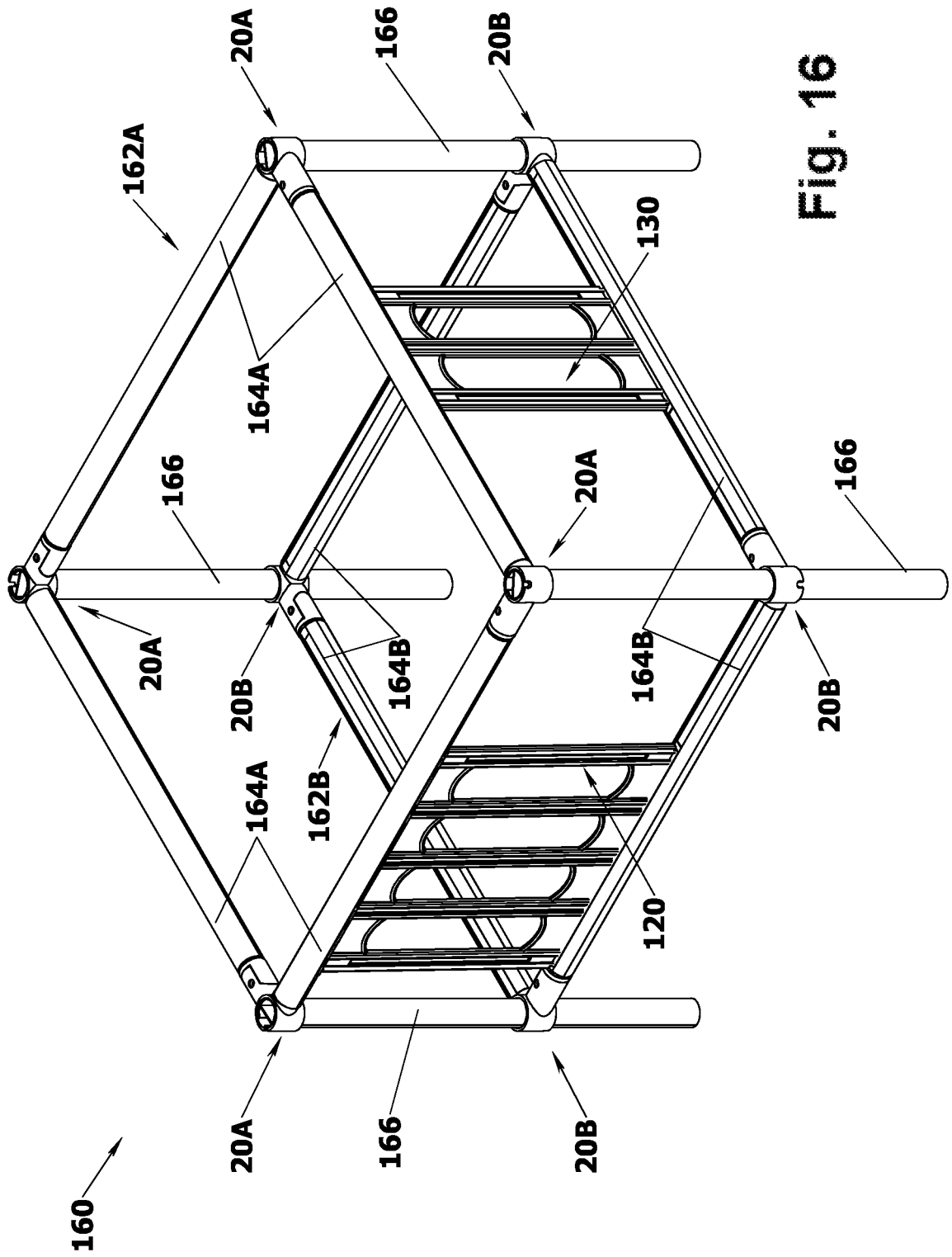
FIG. 16 is an isometric view of a partial assembly of an embodiment of the modular infant furniture of the invention in a crib configuration, using duple and quadruple bar grating, shown in FIGS. 12 and 13.

To depict the method of construction of the framework forming the infant furniture, reference is now made to FIGS. 4A and 4B. Structural member, such as members 10, are inserted into annular portion 22 of triad connector 20, typically forming the vertical structural elements of the framework forming the infant furniture, as illustrated in FIG. 16. Hinge portion 32 of complimentary unit 30 is inserted into and pivotally connected with hinge portion 26 of triad connector 20, by the means of a pivot (not shown) inserted into apertures 27.

Into frusto-arcuate channels of longitudinal and lateral members 10, are respectively detachably inserted arcuately ribbed portion 24 of triad connector 20 and arcuately ribbed portion 34 of complimentary unit 30. The assembly forms a perpendicular connection of three structural members 10, which may form a corner of a cubical or rectangular parallelepiped structure, depending on the length of the members, as illustrated in FIG. 16.

Reference is now made to FIG. 5A to 5D, showing superior female connector 50, in accordance with some embodiments of the invention. Superior female connector 50 comprises base portion 52 and bar connector portion 56. Base portion 52 comprises frusto-arcuate face 54, adapted to confirm the frusto-arcuate channels of structural members, thereby base portion 52 is insertable thereto and contiguously translatable therein. Bar connector portion 56 comprises oval ridge 58, defining oval aperture 59, adapted to receive a terminal portion of bar element, such as bar element shown in FIG. 14A to 14D and/or FIG. 15A to 15D.

Optionally, female connector 50 comprises slit 55, which provides for conforming the slot of at the top of the frusto-arcuate channels of structural members (not shown). Consequently, bar connector portion 56 extends somewhat asymmetrically relatively to base portion 52, whereby connector portion 56 can be wider and be positioned somewhat offset off the longitudinal symmetry plane of base portion 52, typically inwards the infant furniture.

Reference is now made to FIG. 6A to 6D, showing inferior female connector 60, in accordance with some embodiments of the invention. Inferior female connector 60 comprises base portion 62 and bar connector portion 66. Inferior female connector 60 further comprises supporting plate 61 extending from base portion 62, essentially perpendicularly to bar connector portion 66. Supporting plate 61 adapted to sustain a bottom plate of the infant furniture, such as bottom plate shown FIG. 18A to 18C.

Base portion 62 comprises frusto-arcuate face 64, adapted to confirm the frusto-arcuate channels of structural members, thereby base portion 62 is insertable thereto and contiguously translatable therein. Bar connector portion 66 comprises oval ridge 68, defining oval aperture 69, adapted to receive a terminal portion of bar element, such as bar element shown in FIG. 14A to 14D and/or FIG. 15A to 15D.

Optionally, female connector 60 comprises slit 65, which provides for conforming the slot of at the top of the frusto-arcuate channels of structural members (not shown). Consequently, bar connector portion 66 extends somewhat asymmetrically relatively to base portion 62, whereby connector portion 66 can be wider and positioned somewhat offset the longitudinal symmetry plane of base portion 62, typically inwards the infant furniture.

Reference is now made to FIG. 7A to 7D, showing inferior female connector 70, in accordance with some embodiments of the invention. Inferior female connector 70 comprises base portion 72 and bar connector portion 76. Inferior female connector 70 further comprises affixing plate 71 extending from base portion 72, essentially perpendicularly to bar connector portion 76. Affixing plate 71 is relatively thinner than supporting plate 61 of female connector 60 shown in FIG. 6A to 6D. Affixing plate 71 comprises apertures 73, adapted to receive snapping pins of an affixing connector, such as bar element shown in FIG. 10A to 10D.

Base portion 72 comprises a frusto-arcuate face, adapted to confirm the frusto-arcuate channels of structural members, thereby base portion 72 is insertable thereto and contiguously translatable therein. Bar connector portion 76 comprises oval ridge 78, defining oval aperture 79, adapted to receive a terminal portion of a bar element, such as bar element shown in FIG. 14A to 14D and/or FIG. 15A to 15D.

Optionally, female connector 70 comprises slit 75, which provides for conforming the slot of at the top of the frusto-arcuate channels of structural members (not shown). Consequently, bar connector portion 76 extends somewhat asymmetrically relatively to base portion 72, whereby connector portion 76 can be wider and positioned somewhat offset the longitudinal symmetry plane of base portion 72, typically inwards the infant furniture.

Reference is now made to FIG. 8A to 8D, showing superior male connector 80, in accordance with some embodiments of the invention. Superior male connector 80 comprises base portion 82 and bar connector portion 86. Base portion 82 comprises frusto-arcuate face 81, adapted to confirm the frusto-arcuate channels of structural members, thereby base portion 82 is insertable thereto and contiguously translatable therein. Bar connector portion 86 comprises oval embossment 84 preferably conforms the outer edge, of a bar element compatible with male connectors, such as bar element shown in FIG. 15A to 15D.

Four pawls 88 extending upwardly from oval embossment 84 preferably, adapted to be inserted into a terminal portion of bar element compatible with male connectors, such as bar element shown in FIG. 15A to 15D. Consequently a terminal portion of a bar element compatible with male connectors, such as bar element shown in FIG. 15A to 15D is affixable on bar connector portion 86 of superior male connector 80.

Reference is now made to FIG. 9A to 9D, showing superior male connector 90, in accordance with some embodiments of the invention. Superior male connector 90 comprises base portion 92 and bar connector portion 96. Superior male connector 90 further comprises supporting plate 95 adapted to sustain a bottom plate of the infant furniture, such as bottom plate shown FIG. 18A to 18C.

Base portion 92 comprises frusto-arcuate face 91, adapted to confirm the frusto-arcuate channels of structural members, thereby base portion 92 is insertable thereto and contiguously translatable therein. Bar connector portion 96 comprises oval embossment 94 preferably conforms the outer edge, of a bar element compatible with male connectors, such as bar element shown in FIG. 15A to 15D.

Four pawls 98 extending upwardly from oval embossment 94 preferably, adapted to be inserted into a terminal portion of a bar element compatible with male connectors, such as bar element shown in FIG. 15A to 15D. Consequently a terminal portion of a bar element compatible with male connectors, such as bar element shown in FIG. 15A to 15D, is affixable on bar connector portion 96 of superior male connector 90.

Reference is now made to FIG. 10A to 10D, showing superior male connector 100, in accordance with some embodiments of the invention. Superior male connector 100 comprises base portion 102 and bar connector portion 106. Superior male connector 100 further comprises affixing plate 105. Affixing plate 105 is relatively thinner than supporting plate 95 of male connector 90 shown in FIG. 9A to 9D. Affixing plate 105 comprises apertures 109, adapted to receive snapping pins of an affixing connector, such as bar element shown in FIG. 11A to 11D.

Base portion 102 comprises frusto-arcuate face 101, adapted to confirm the frusto-arcuate channels of structural members, thereby base portion 102 is insertable thereto and contiguously translatable therein. Bar connector portion 106 comprises oval embossment 104 preferably conforms the outer edge, of a bar element compatible with male connectors, such as bar element shown in FIG. 15A to 15D.

Four pawls 108 extending upwardly from oval embossment 104 preferably, adapted to be inserted into a terminal portion of a bar element compatible with male connectors, such as bar element shown in FIG. 15A to 15D. Consequently a terminal portion of a bar element compatible with male connectors, such as bar element shown in FIG. 15A to 15D, is affixable on bar connector portion 106 of superior male connector 100.

Reference is now made to FIG. 11A to 11D, showing affixing connector 110, in accordance with some embodiments of the invention. Affixing connector 110 is compatible with the affixing plate of inferior male connectors, such as inferior male connectors shown in FIG. 7A to 7D and FIG. 10A to 10D. Affixing connector 110 comprises base plate 112. Base plate 112 is of an essentially rectangular shape, with rounded corners, adapted to conform with the affixing plate of inferior male connectors, such as inferior male connectors shown in FIG. 7A to 7D and FIG. 10A to 10D. The thickness of base plate 112 is typically corresponds to the deference between the thickness of supporting plate of inferior male connectors shown in FIG. 6A to 6D and FIG. 9A to 9D and the thickness of affixing plate of inferior male connectors shown in FIG. 7A to 7D and FIG. 10A to 10D.

Affixing connector 110 further comprises snapping pins 114. Snapping pins 114 include a somewhat larger terminal portion and a slot. Snapping pins 114 are adapted to be inserted into the corresponding apertures in affixing plate of inferior male connectors shown in FIG. 7A to 7D and FIG. 10A to 10D. The terminal portion is adapted to surpass the corresponding apertures and thereafter to snap; thereby securing affixing connector 110 onto the affixing plate of inferior male connectors shown in FIG. 7A to 7D and FIG. 10A to 10D.

Affixing connector 110 further comprises affixing portion 116. Affixing portion 116 includes pin 118, upwardly erecting from base plate 112. At the terminal portion thereof, pin 118 is furnished with jog 119. Pin 118 is adapted to be inserted into the bottom plate of the infant furniture, such as bottom plate FIG. 18A to 18C; whereas jog 119 is adapted to lock the bottom plate of the infant furniture, preventing an upward and/or lateral displacement thereof.

Figure 12:
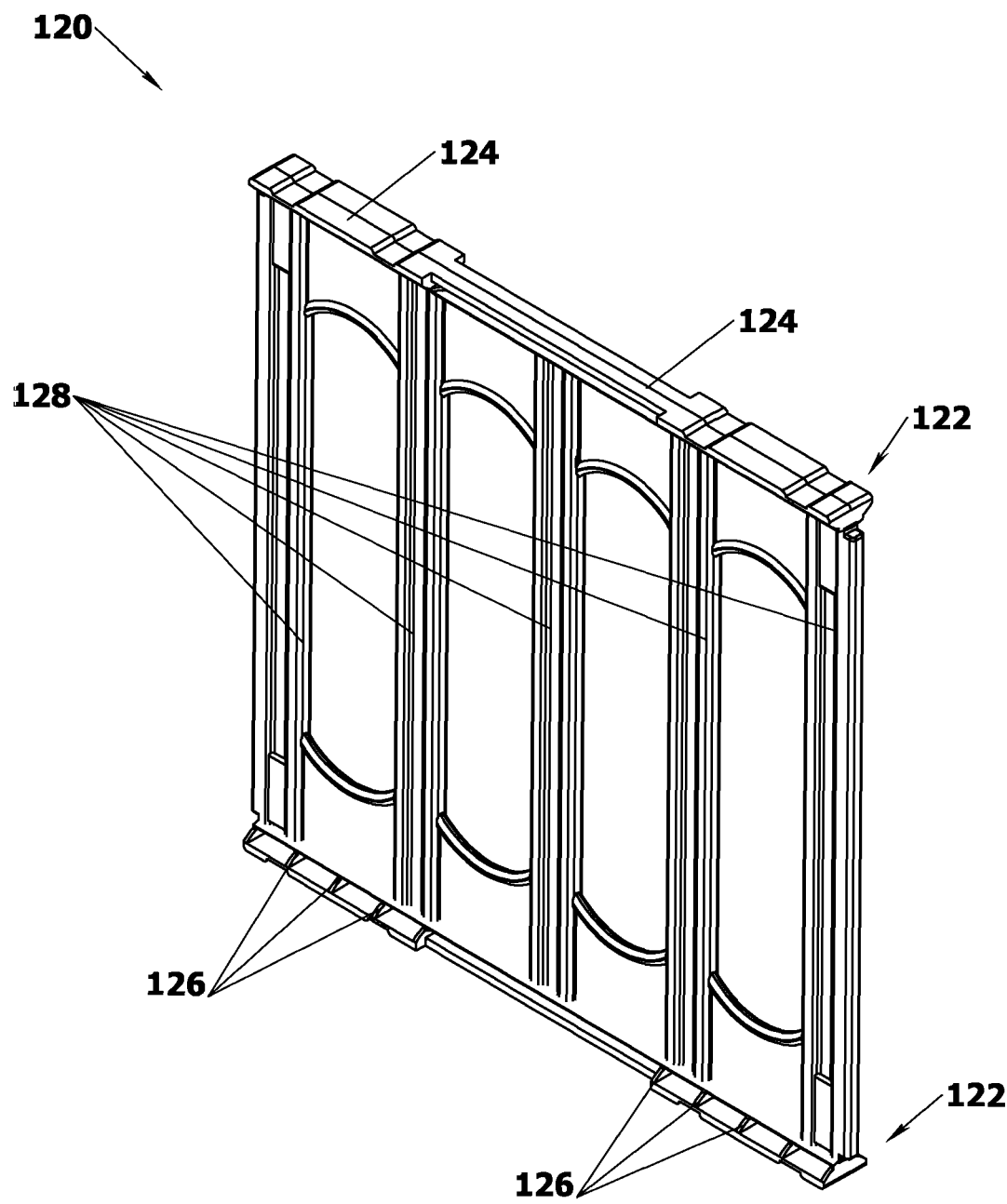
FIG. 12 is an isometric view of a quadruple bar grating for the construction of an embodiment of the modular infant furniture of the invention in a crib configuration.

Reference is now made to FIG. 12, showing quadruple bar grating 120, in accordance with some embodiments of the invention. Quadruple bar grating 120 is used for the construction of an embodiment of the modular infant furniture of the invention in a crib configuration, as illustrated in FIG. 16. Quadruple bar grating 120 comprises superior and inferior base portions 122. Superior and inferior base portions 122 terminate with an essentially plane surface 124. Plane surface 124, of superior and inferior base portions 122, is adapted for a contiguous translation about the partition of structural members, such as partition 14 of structural member 10, shown in FIG. 1A to 1E.

Superior and inferior base portions 122 are furnished with frusto-arcuate ribs, adapted to conform the frusto-arcuate channel formed in the structural members, such as frusto-arcuate channel formed in-between partition 14 and slot 16, of structural member 10, shown in FIG. 1A to 1E. Superior and inferior base portions 122 further comprise bars 128, defining four passages in-between. Bars 128 are adapted to extend outwardly from the slot in the structural members, such as slot 16, of structural member 10, shown in FIG. 1A to 1E. This provides for a contiguous translation of superior and inferior base portions 122 of bar grating 120, within the frusto-arcuate channel in structural members, in such a manner that bars 128 extend outwardly from the slot thereof.

Figure 13:
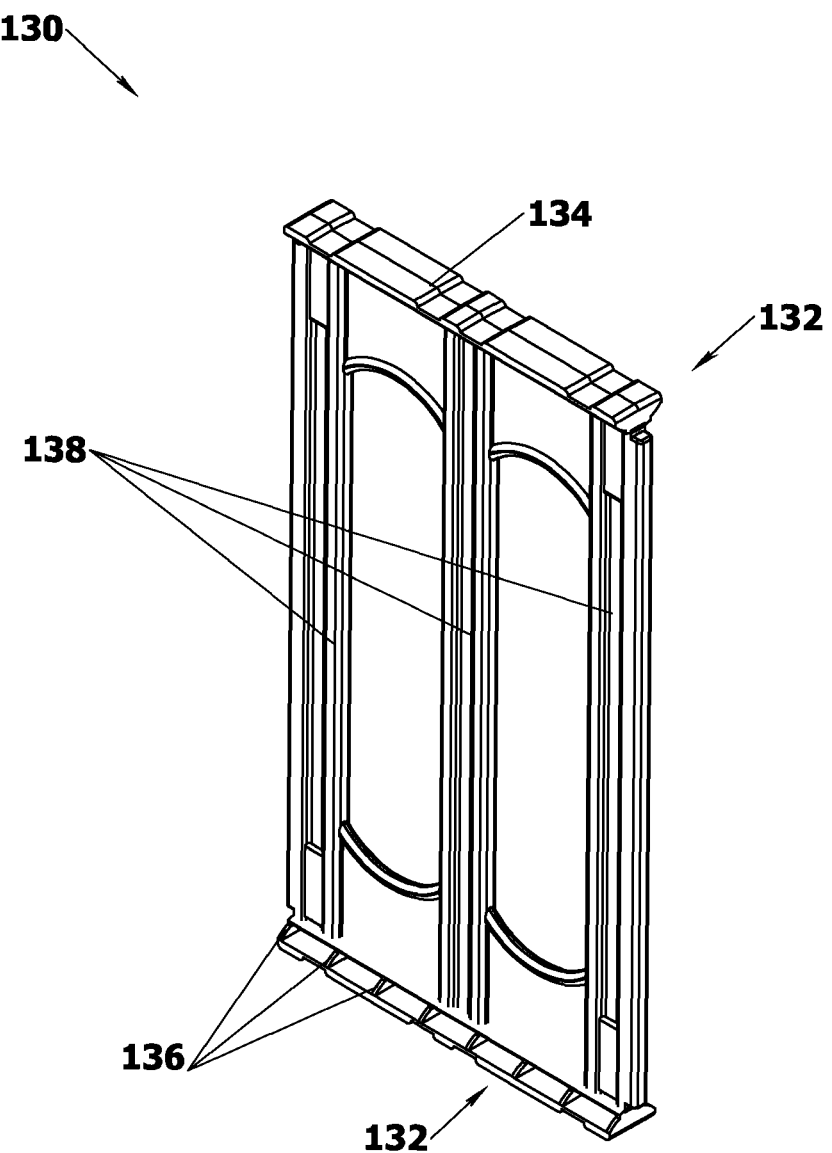
FIG. 13 is an isometric view of a duple bar grating for the construction of an embodiment of the modular infant furniture of the invention in a crib configuration.

Reference is now made to FIG. 13, showing duple bar grating 130, in accordance with some embodiments of the invention. Duple bar grating 130 is used for the construction of an embodiment of the modular infant furniture of the invention in a crib configuration, as illustrated in FIG. 16. Duple bar grating 130 comprises superior and inferior base portions 132. Superior and inferior base portions 132 terminate with an essentially plane surface 134. Plane surface 134, of superior and inferior base portions 132, is adapted for a contiguous translation about the partition of structural members, such as partition 14 of structural member 10, shown in FIG. 1A to 1E.

Superior and inferior base portions 132 are furnished with frusto-arcuate ribs, adapted to conform the frusto-arcuate channel formed in the structural members, such as frusto-arcuate channel formed in-between partition 14 and slot 16, of structural member 10, shown in FIG. 1A to 1E. Superior and inferior base portions 132 further comprise bars 138, defining two passages in-between. Bars 138 are adapted to extend outwardly from the slot in the structural members, such as slot 16, of structural member 10, shown in FIG. 1A to 1E. This provides for a contiguous translation of superior and inferior base portions 132 of bar grating 130, within the frusto-arcuate channel in structural members, in such a manner that bars 138 extend outwardly from the slot thereof.

The length of bars 128 of quadruple bar grating 120 shown in FIG. 12 as well as bars 138 of duple bar grating 130 shown in FIG. 13 is preferably adapted for an assembly of an embodiment of the modular infant furniture of the invention in a crib configuration, as illustrated in FIG. 16.

Reference is now made to FIG. 14A to 14D, showing in accordance with some embodiments of the invention a segment of bar element 140, compatible with female connectors, such as female connectors, shown in FIG. 5A to 7D. Bar element 140 is preferably wooden. Bar element 140 comprises elongated profile 142 of an indefinite length that is typically cut into segments of predetermined length, from a sufficiently long master piece. Profile 142 embodies oval outline contour 144. Oval outline contour 144 conforms with female connectors, such as female connectors, shown in FIG. 5A to 5D, whereby the terminal portion of bar element 140 is adapted to be inserted into the oval aperture defined by the oval ridge of bar connector portion of female connectors, such as oval apertures 59, 69 and/or 79 at bar connector portions 56, 66 and/or 76 of female connectors 50, 60 and/or 70 shown in FIG. 5A to 7D.

Reference is now made to FIG. 15A to 15D, showing in accordance with some embodiments of the invention a segment of bar element 150, compatible with female connectors, such as female connectors, shown in FIG. 5A to 7D, as well as with male connectors, such as male connectors, shown in FIG. 8A to 10D. Bar element 150 is typically polymeric. Bar element 150 comprises elongated profile 152 of an indefinite length that is typically cut into segments of predetermined length, from a sufficiently long master piece. Profile 152 embodies oval-shell outline contour 154. Oval-shell outline contour 154 conforms with female connectors, such as female connectors, shown in FIG. 5A to 5D. Consequently the terminal portion of bar element 150 is adapted to be inserted into the oval aperture defined by the oval ridge of bar connector portion of female connectors, such as oval apertures 59, 69 and/or 79 at bar connector portions 56, 66 and/or 76 of female connectors 50, 60 and/or 70 shown in FIG. 5A to 7D.

Moreover, bar element 150 comprises two perpendicular partitions 156. Perpendicular partitions 156 extend throughout the entire length of bar element 150. Perpendicular partitions 156 divide the interior of bar element 150 into four symmetrical channels 158. Channels 158 are adapted to receive the four pawls extending upwardly from oval embossment of the male connectors, such as male connectors, shown in FIG. 8A to 10D. Consequently the terminal portion of bar element 150 is adapted to receive the pawls of male connectors, such pawls 88, 98 and/or 108 at bar connector portions 86, 96 and/or 106 of male connectors 80, 90 and/or 100 shown in FIG. 8A to 10D; whereby bar element 150 is affixable on bar connector portion, 96 and/or 106 of male connector 80, 90 and/or 100.

Reference is now made to FIG. 16, showing partial assembly 160 of an embodiment of the modular infant furniture of the invention in a crib configuration, using duple and quadruple bar grating 130 and 120, shown in FIGS. 12 and 13. Assembly 160 comprises superior and inferior quadratic frames 162A and 162B. Superior and inferior quadratic frames 162A and 162B are assembled from structural members 164A and 164B as well as triad connectors 20A and 20B, respectively. Structural members 164A and 164B are also shown in FIG. 1A to 1E. Structural members 164A and 164B are connected by the means of triad connectors 20A and 20B as well as complimentary units thereof, such as triad connectors 20 and complimentary units 30 shown in FIG. 2A to 3C.

Assembly 160 further comprises vertical structural members 166. Vertical structural members 166 are typically either structural member 10 shown in FIG. 1A to 1E and/or a plane cylindrical member (not shown). Vertical structural members 166 are inserted into the annular portions of triad connector 20A and 20B, forming the vertical structural elements or the legs of the assembly of the infant furniture, illustrated in FIG. 16.

Superior and inferior base portions (not shown) of duple and quadruple bar grating 130 and 120, shown in FIGS. 12 and 13, are inserted into frusto-arcuate channels of respective structural members 164A and 164B. Inferior quadratic frame 162B is affixed to vertical structural members 166 somewhat distanced from the floor (not shown), as shown. The assembly illustrated in FIG. 16 forms an essentially cubical structure. It should be acknowledged however that any cubical or rectangular parallelepiped structure, depending on the length of the members, is achievable in a similar manner.

In accordance with some preferred embodiments of the invention, reference is now made to FIG. 17A to 17E, showing partial sub-assembly 170 of inferior frame 172 for an embodiment of the modular infant furniture of the invention, using inferior female connectors 60 and 70 as well as inferior male connectors 90 and 100 in combination with bar elements 150 and 160.

Inferior quadratic frame 172 is assembled from structural members 174 and triad connectors 20. Structural members 174 are also shown in FIG. 1A to 1E. Structural members 174 are connected by the means of triad connectors 20 and complimentary units thereof, such as triad connectors 20 and complimentary units 30 shown in FIG. 2A to 3C.

The base portions inferior female connectors 60 and 70 as well as inferior male connectors 90 and 100 are inserted into the frusto-arcuate channels of structural members 174, thereby female connectors 60 and 70 as well as inferior male connectors 90 and 100 are contiguously translatable therein.

Affixing connector 110 is appended to and affixed within affixing plates 71 and 105, of female connectors 70 and 100, respectively.

The terminal portion of bar element 150 is inserted into the oval aperture defined by the oval ridge of bar connector portion of female connectors 60 and 70, such as oval apertures 69 and/or 79 at bar connector portions 66 and/or 76 of female connectors 60 and/or 70 shown in FIG. 6A to 7D. The terminal portion of bar element 160 is affixed onto the bar connector portion of male connectors 90 and 100, such as pawls 98 and/or 108 of bar connector portions 96 and/or 106 of male connectors 90 and/or 100 shown in FIG. 9A to 10D.

In accordance with some preferred embodiments of the invention, reference is now made to FIG. 18A to 18C, showing partial assembly 180 of an embodiment of the modular infant furniture of the invention, in a play-pen configuration, using female connectors shown in FIG. 5A to 7D and male connectors shown in FIG. 8A to 10D as well as bar elements shown in FIGS. 14 and 15.

Assembly 180 comprises superior and inferior quadratic frames 182A and 182B. Superior and inferior quadratic frames 182A and 182B are assembled from structural members 184A and 184B as well as triad connectors 20A and 20B, respectively. Structural members 184A and 184B are also shown in FIG. 1A to 1E. Structural members 184A and 184B are connected by the means of triad connectors 20A and 20B as well as complimentary units thereof, such as triad connectors 20 and complimentary units 30 shown in FIG. 2A to 3C.

Assembly 180 further comprises vertical structural members 186. Vertical structural members 186 are typically either structural member 10 shown in FIG. 1A to 1E and/or a plane cylindrical member (not shown). Vertical structural members 186 are inserted into the annular portions of triad connector 20A and 20B, forming the vertical structural elements or the legs of the assembly of the infant furniture, illustrated in FIG. 18A.

The base portions of inferior female connectors 60 and 70 as well as inferior male connectors 90 and 100 are inserted into the frusto-arcuate channels of structural members 184B, thereby female connectors 60 and 70 as well as inferior male connectors 90 and 100 are contiguously translatable therein. Affixing connectors 110 are appended to and affixed within affixing plates, of inferior female and male connectors 70 and 100, respectively.

Spacers (not shown) of a predetermined length are typically provided in-between female connectors 50, 60 and 70 and male connectors 80, 90 and 100, threaded into the same frusto-arcuate channel of structural member 184A and/or 184B. These spacers (not shown) are typically having the profile of the base portion of female connectors 50, 60 and 70 and male connectors 80, 90 and 100, thereby precluding longitudinal movement thereof inside the frusto-arcuate channels of structural members 184A and/or 184B.

The terminal portions of bar elements 150 is inserted into the oval aperture defined by the oval ridge of bar connector portion of female connectors 50, 60 and 70, such as oval apertures 59, 69 and/or 79 at bar connector portions 56, 66 and/or 76 of female connectors 50, 60 and/or 70 shown in FIG. 5A to 7D. The terminal portions of bar elements 160 is affixed onto the bar connector portion of male connectors 80, 90 and 100, such as pawls 88, 98 and/or 108 of bar connector portions 86, 96 and/or 106 of male connectors 80, 90 and/or 100 shown in FIG. 8A to 10D.

The jogs of affixing connectors 110 are inserted through bottom plate 200; thereby preventing an upward and lateral displacement of the latter. Bottom plate 200 is supported by the supporting plates of inferior connectors 60 and 90.

It will be appreciated by persons skilled in the art that the present invention is not limited by what has been particularly shown and described herein above. Rather the scope of the invention is defined by the claims which follow:

What is claimed is:

1. A bar assembly for modular infant furniture, comprising:
(A) at least one superior female connector, said superior female connector having:
[i] a base portion, said base portion comprising a frusto-arcuate face, configured to conform with a frusto-arcuate channel of structural members, thereby said base portion is insertable into said frusto-arcuate channel and contiguously translatable therein;
[ii] a bar connector portion, said bar connector portion comprising an oval ridge, defining an oval aperture, configured to receive a terminal portion of an oval bar element;
(B) at least one inferior female connector, said inferior female connector having:
[i] a base portion, said base portion comprising a frusto-arcuate face, adapted to conform with said frusto-arcuate channel of said structural members, thereby said base portion is insertable into said frusto-arcuate channel and contiguously translatable therein;
[ii] a bar connector portion, said bar connector portion comprising an oval ridge, defining an oval aperture, adapted to receive a terminal portion of an oval bar element;
[iii] a supporting plate extending from said base portion of said inferior female connector, essentially perpendicularly to bar connector portion of said inferior female connector, defining an upper supporting surface;
(C) at least one bar element compatible with said female connectors, said bar element comprising an elongated profile which embodies an oval outline contour, said oval outline contour conforming with said female connectors, whereby a terminal portion of said bar element is insertable into said oval aperture defined by said oval ridge of said bar connector portion of said female connectors;
(D) a bottom plate of said infant furniture;
wherein said supporting plate is configured to engage said bottom plate of said infant furniture on said upper supporting surface, thereby rendering said bottom plate suspendable from said at least one inferior female connector.

2. The bar assembly for modular infant furniture as set forth in claim 1, wherein said female connectors further comprising a slit, which provides for conforming with a slot at the top of said frusto-arcuate channel of said structural members.

3. The bar assembly for modular infant furniture as set forth in claim 1, wherein said bar connector portion of said female connectors extends somewhat asymmetrically relatively to said base portion thereof.

4. The bar assembly for modular infant furniture as set forth in claim 1, wherein said bar connector portion of said female connectors is positioned somewhat offset the longitudinal symmetry plane of said base portion.

5. The bar assembly for modular infant furniture as set forth in claim 1, wherein said bar connector portion of said female connectors is positioned somewhat offset the longitudinal symmetry plane of said base portion, inwards said infant furniture.

6. The bar assembly for modular infant furniture as set forth in claim 1, further comprising at least one spacer of a predetermined length.

7. The bar assembly for modular infant furniture as set forth in claim 6, wherein said spacer is disposed in-between two adjacent female connectors inserted into said frusto-arcuate channel of a structural member.

8. The bar assembly for modular infant furniture as set forth in claim 6, wherein said spacers have a profile of said base portion of said female connectors.

9. The bar assembly for modular infant furniture as set forth in claim 6, wherein said spacers preclude longitudinal movement of said female connectors inside said frusto-arcuate channels of said structural members.

10. A kit-of-parts, for an assembly of modular infant furniture, comprising:
    (A) at least two female connectors, wherein at least one of said at least two female connectors comprises:
    (I) a superior female connector, said superior female connector comprising:
        (i) a base portion, said base portion comprising a frusto-arcuate face, configured to conform with a frusto-arcuate channel of structural members, said thereby base portion is insertable said frusto-arcuate channel and contiguously translatable therein;
        (ii) a bar connector portion, said bar connector portion comprising a ridge, defining an aperture, adapted to receive a terminal portion of a bar element; and
    (II) an inferior female connector, said inferior female connector comprising:
        (i) a base portion, said base portion comprising a frusto-arcuate face, configured to conform with said frusto-arcuate channel of said structural members, thereby said base portion is insertable into said frusto-arcuate channel and contiguously translatable therein;
        (ii) a bar connector portion, said bar connector portion comprising a ridge, defining an aperture, adapted to receive a terminal portion of a bar element;
        (iii) a supporting plate, said supporting plate extending from said base portion of said inferior female connector, essentially perpendicularly to bar connector portion of said inferior female connector, defining an upper supporting surface; and
    (B) at least one bar element compatible with said female connectors, said bar element comprising an elongated profile which embodies an outline contour, said outline contour configured to conform with said bar connector portion of said female connectors, whereby a terminal portion of said bar element is insertable into said aperture defined by said ridge of said bar connector portion of said female connectors;
    (C) a bottom plate of said infant furniture;
    wherein said supporting plate is configured to engage said bottom plate of said infant furniture on said upper supporting surface, thereby rendering said bottom plate suspendable from said at least one inferior female connector.

\* \* \* \* \*